United States Patent [19]
Kane et al.

[11] Patent Number: 5,705,113
[45] Date of Patent: Jan. 6, 1998

[54] METHOD FOR MAKING ENCAPSULATED SHELF

[75] Inventors: Edmund J. Kane, Holland; Robert S. Herrmann, Grand Haven; Craig S. Blenick, Tenison; Gregory T. Wolters, Holland, all of Mich.

[73] Assignee: Donnelly Technology, Inc., Holland, Mich.

[21] Appl. No.: 422,257

[22] Filed: Apr. 14, 1995

Related U.S. Application Data

[60] Division of Ser. No. 241,133, May 10, 1994, Pat. No. 5,564,809, which is a continuation-in-part of Ser. No. 665,661, Mar. 7, 1991, Pat. No. 5,362,145.

[51] Int. Cl.⁶ .................. B29C 45/14; B29C 70/72
[52] U.S. Cl. .................. 264/261; 264/263; 264/271.1; 264/275
[58] Field of Search .................. 264/250, 255, 264/252, 259, 263, 275, 271.1, 294, 296; 425/117

[56] References Cited

U.S. PATENT DOCUMENTS

| | | | |
|---|---|---|---|
| 786,935 | 4/1905 | Wright . | |
| 1,779,236 | 10/1930 | Hoegger . | |
| 2,144,602 | 1/1939 | Balmer | 248/223 |
| 2,169,295 | 8/1939 | Shuart | 211/153 |
| 2,517,725 | 8/1950 | Schweller | 312/150 |
| 2,604,375 | 7/1952 | Beckett | 312/351 |
| 2,876,910 | 3/1959 | Morton, Jr. | 211/153 |
| 3,234,897 | 2/1966 | Berk | 108/152 |
| 3,331,646 | 7/1967 | Peters | 312/270 |
| 3,603,274 | 9/1971 | Ferdinand | 108/108 |
| 3,604,669 | 9/1971 | Asher | 248/243 |
| 3,633,983 | 1/1972 | Whitcomb | 312/306 |
| 3,672,624 | 6/1972 | Keller | 248/243 |
| 3,984,163 | 10/1976 | Boorman, Jr. et al. | 312/270 |
| 4,015,543 | 4/1977 | Stankowitz | 108/27 |
| 4,603,781 | 8/1986 | Ryan, Jr. | 211/90 |
| 4,723,809 | 2/1988 | Kida et al. | 296/84 |
| 4,729,613 | 3/1988 | Tromble et al. | 312/270 |
| 4,735,470 | 4/1988 | Falk | 312/246 |
| 4,779,939 | 10/1988 | Stich | 312/214 |
| 4,841,698 | 6/1989 | Gold | 52/208 |
| 4,870,907 | 10/1989 | McKee | 108/42 |
| 4,890,746 | 1/1990 | Trulaske, Sr. | 211/59.2 |
| 4,923,260 | 5/1990 | Poulsen | 312/214 |
| 4,934,541 | 6/1990 | Bussan et al. | 211/153 |
| 5,004,202 | 4/1991 | Stumpf et al. | 248/243 |
| 5,273,354 | 12/1993 | Herrmann et al. | 312/408 |
| 5,362,145 | 11/1994 | Bird et al. | 312/408 |
| 5,464,575 | 11/1995 | Jaffiol et al. | 264/277 |

FOREIGN PATENT DOCUMENTS

| | | |
|---|---|---|
| 711879 | 6/1965 | Canada ................ 62/92 |
| 0507455A2 | 10/1992 | European Pat. Off. . |
| 0520786A3 | 12/1992 | European Pat. Off. . |
| 0579364A1 | 1/1994 | European Pat. Off. . |
| 0581419A1 | 2/1994 | European Pat. Off. . |
| 711920 | 9/1941 | Germany . |
| 85357952 U | 9/1986 | Germany . |
| 37 42 719 A1 | 7/1989 | Germany . |
| 90065131 U | 9/1990 | Germany . |
| 90041801 U | 9/1991 | Germany . |
| 63-57213 | 3/1988 | Japan . |
| 2147310 | 6/1990 | Japan . |

Primary Examiner—Angela Y. Ortiz
Attorney, Agent, or Firm—Van Dyke, Gardner, Linn & Burkhart, LLP

[57] ABSTRACT

An encapsulated shelf assembly has a shelf support supporting a panel. The panel has an edge and a one piece member encapsulates the panel edge and a substantial majority of the shelf support. The encapsulated shelf assembly may be formed in a mold apparatus which defines a mold cavity and uses a spacing plug to position the shelf support in a mold cavity of the mold apparatus in a location spaced from the sides of the mold cavity. A method of making the encapsulated shelf assembly includes providing a mold apparatus defining a mold cavity, providing and supporting a shelf panel in the mold apparatus with an edge of the panel extending into the cavity, providing and supporting a shelf support in the mold apparatus with a majority of the shelf support positioned in the mold cavity and spaced from the sides of the mold cavity, filling the mold cavity with a moldable material to encapsulate each of the majority of the shelf support and the edge of the shelf panel, and removing the encapsulated shelf assembly from the mold cavity.

14 Claims, 12 Drawing Sheets

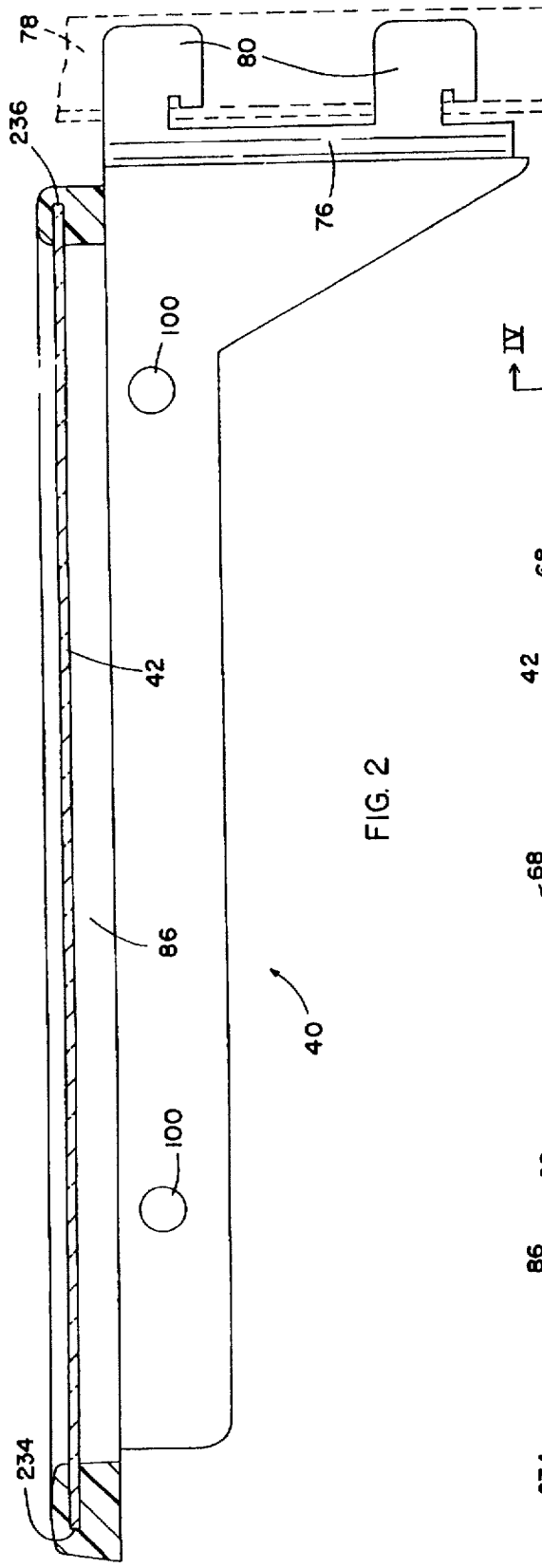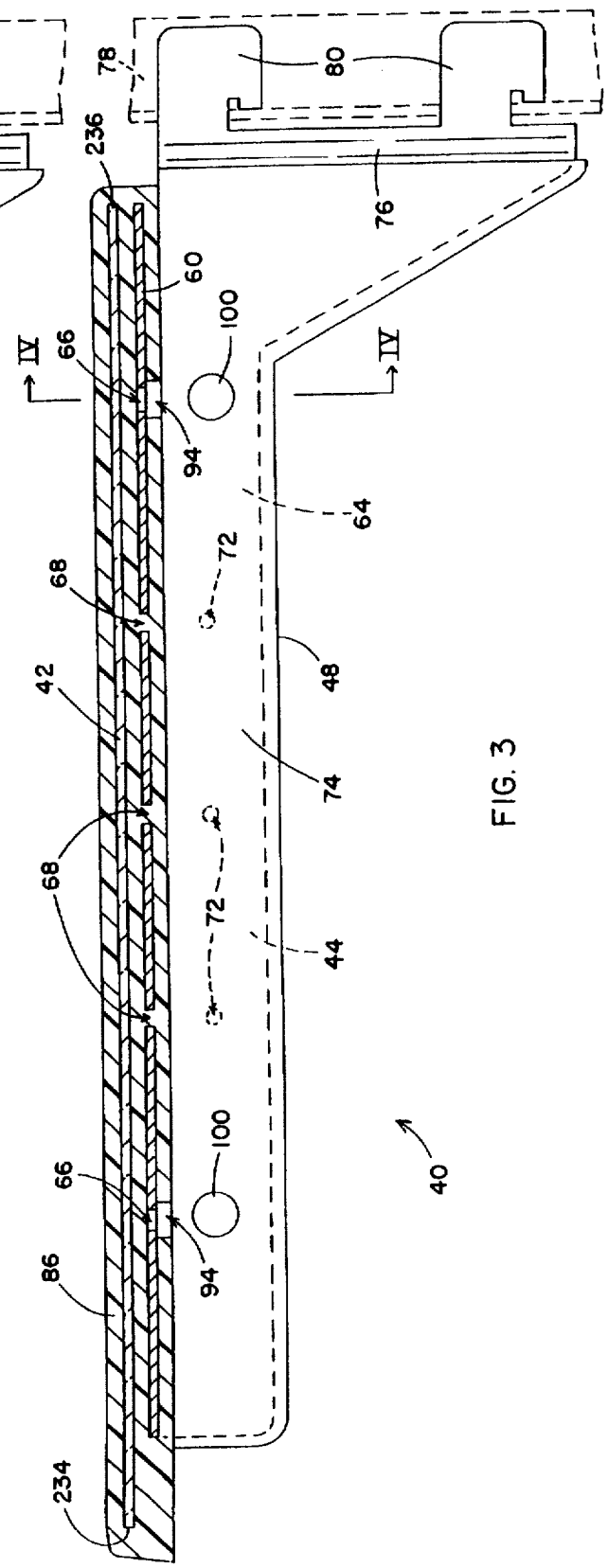

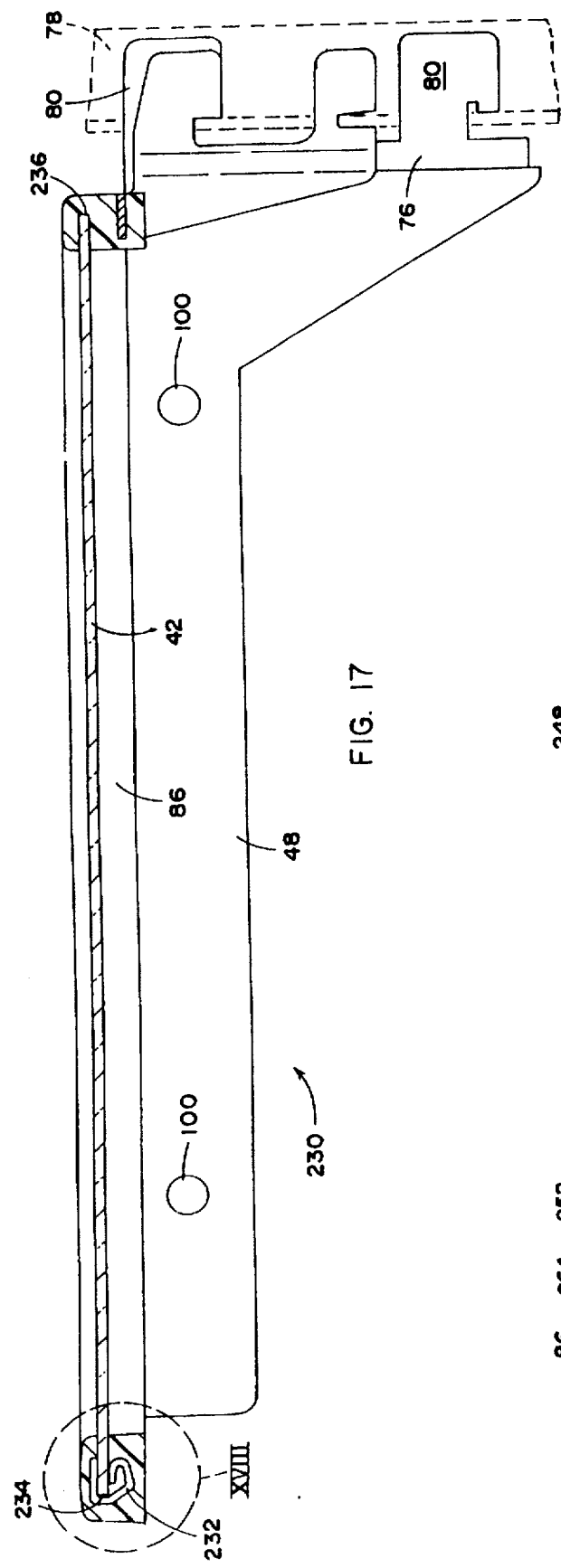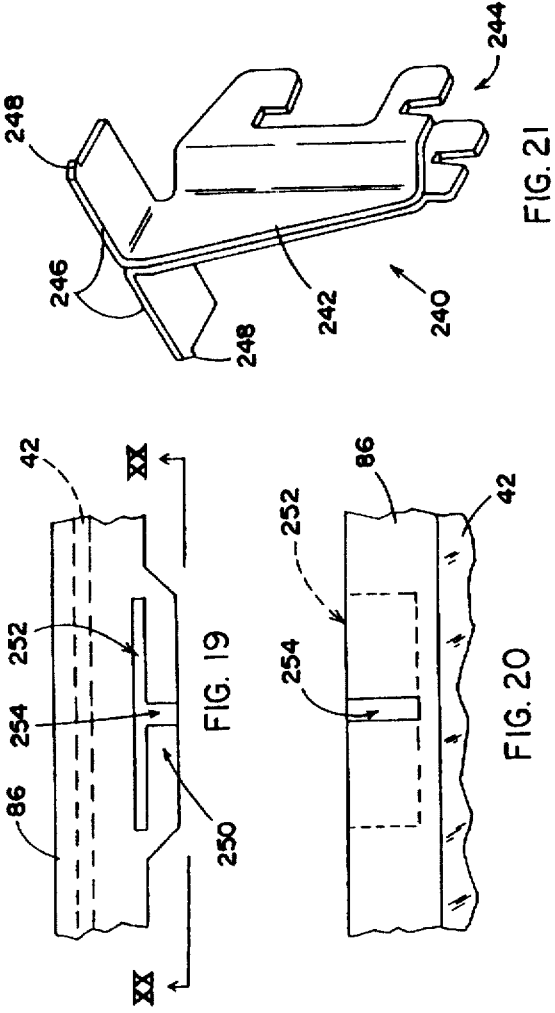

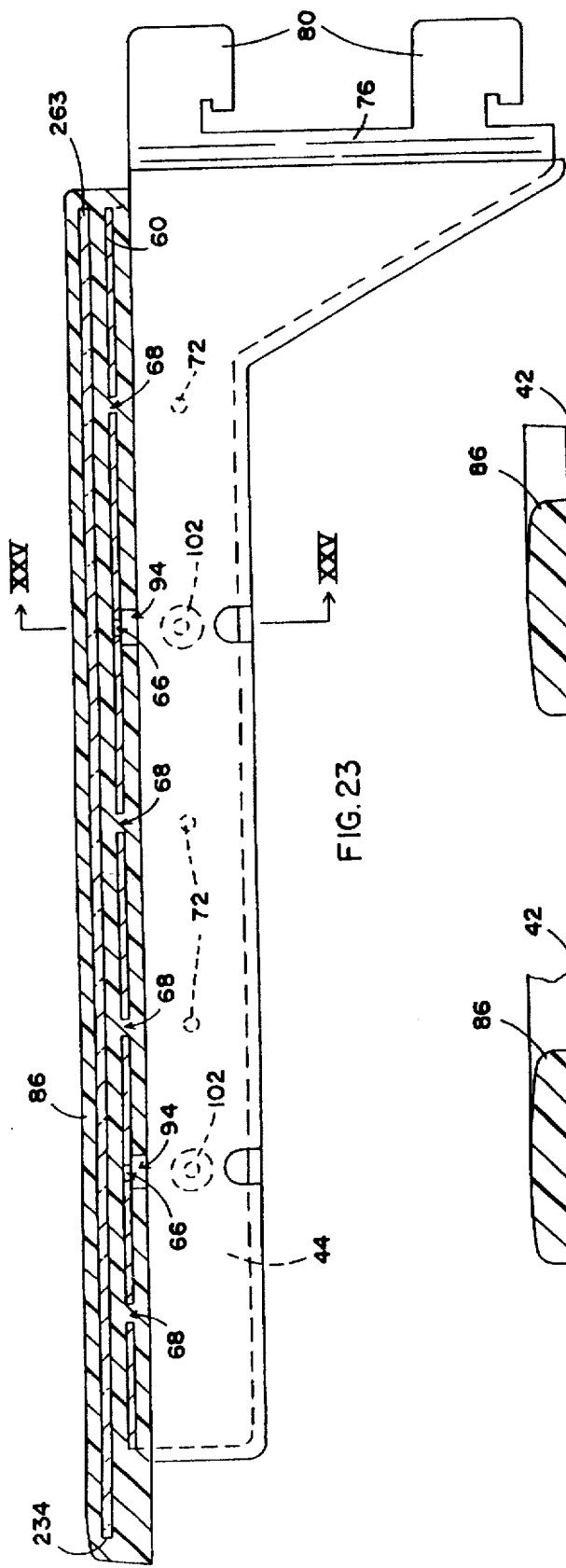
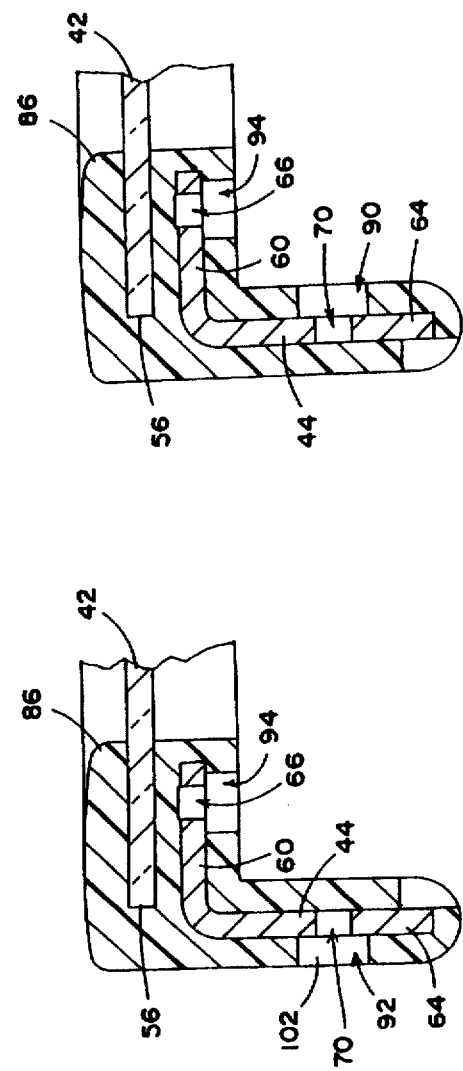
FIG. 23
FIG. 24
FIG. 25

1

METHOD FOR MAKING ENCAPSULATED SHELF

CROSS-REFERENCE TO RELATED APPLICATION

This is a division of application Ser. No. 08/241,133, entitled ENCAPSULATED SHELF AND PROCESS FOR MAKING, filed May 10, 1994, now U.S. Pat. No. 5,564,809, which is a continuation-in-part of application Ser. No. 07/665,661, entitled MOLDED REFRIGERATOR SHELF, filed Mar. 7, 1991, now U.S. Pat. No. 5,362,145, the disclosure of which is incorporated here by reference.

BACKGROUND OF INVENTION

This invention relates to shelving and is particularly beneficial when used as refrigerator shelving and the like.

Articles containing liquid are spillable and, as is their nature, do spill. In the context of a refrigerator for example, such a spill will typically soak into other items and contaminate other foods. Extensive cleanup efforts will commonly be required for spills which often flow downward from one shelf to another shelf. Containment measures for limiting the area of such a spill are, therefore, desirable. One such measure is a spill resistant shelf to contain a spill to the shelf upon which the spill occurs to minimize, if not preclude, downward flow of the spill.

Previously known spill resistant shelves include a shelf with a two-piece "picture frame" rim circumscribing the periphery of a glass panel or the like. A silicone seal or the like is commonly provided between the frame and the top of the glass panel for liquid spill resistance. However, such prior known spill resistant shelves do not resolve and may actually promote yet another problem. Items which are spilled upon such shelves can seep between the glass panel and the surrounding frame to a location which is difficult, if not practically impossible, to clean. Thus, and in spite of the sanitary benefits of using a glass panel, for example, an unsanitary condition readily develops when food stuffs become trapped between the panel and frame members of the known shelf structures.

Another consideration in designing shelving for a refrigerated compartment is the circulation or convection of air through the compartment. Air circulation is desirable to maintain a homogenous temperature distribution and avoid thermal stratification in which a range of temperature zones develop in the compartment with the coldest zone at the bottom and the warmest zone at the top. Thus, the structure of an effective refrigerator design will typically include air passage spaces at either side of and behind each solid shelf panel. However, the air passage spaces directly decrease the shelf surface area. The width of a framing structure surrounding the shelf as discussed above, also reduces the available shelf area. A reduction in shelf area directly reduces the storage or holding capacity of the shelf and the associated refrigerator. While the reduction in shelf area attributable to air passage around the shelf perimeter is dictated by thermodynamic performance, the area lost to perimeter framing results from structural and design limitations imposed by accommodating the convenience of a spill resistant shelf.

Finally, ease of use and aesthetic considerations are important to today's purchasing market and have become competitive elements for manufacturers. In response, designers are specifying uncluttered and bright visual appearances with simple, clean lines which enhance utility and appearance. Modular shelving systems which enhance versatility are also desired. However, previously known shelf assemblies directed to these concerns typically include multiple parts which are subject to loss and which require skilled or sophisticated labor to assemble. Further, cracks and crevices inherently defined between adjacent, assembled parts provide food traps and lead to sanitation or cleaning problems for the user, as discussed above. Thus, there is clearly a need for a spill resistant shelf providing simple lines with ease of cleaning and modular adaptability to various storage tasks.

SUMMARY OF THE INVENTION

Accordingly, the present invention provides an encapsulated shelf assembly having a panel with two opposing panel edges, a shelf support supporting the panel, and a one piece member encapsulating each of the two opposing panel edges and encapsulating at least a substantial majority of the shelf support. In one aspect of the invention, the shelf support has at least one aperture through the shelf support. The aperture has two opposing aperture ends and the one piece member has a recess aligned with the aperture at one of the two opposing aperture ends. Further, the one piece member may have a second recess aligned with the aperture at the other of the two opposing aperture ends to define a fastening aperture through the first recess, the aperture through the shelf support, and the second recess.

In another aspect of the invention, a support device, including, but not limited to, a slide guide for a bin or a drawer or the like is connected with the shelf support by a fastener extending into the fastening aperture. The shelf support may have a support body and a support mount, with the support mount releasably coupling at a plurality of vertically spaced positions with an interior surface of a refrigerated compartment.

In yet another aspect of the invention, the shelf assembly may include a plug positioned in the fastening aperture. The plug has a head seated in the first recess of the one piece member and has a shaft extending away from the head and through the aperture in the shelf support. The plug may also have a cooperating nut seated in the second recess of the one piece member, the nut having an opening coupled with the shaft.

In a further aspect of the invention, the panel has a perimeter edge which incorporates the two opposing panel edges and surrounds the panel. The one piece member encapsulates the perimeter edge, defining a perimeter rim. The shelf may further include a seal to resist liquid penetration between the one piece member and the panel. The one piece member may also be formed around the perimeter edge and the shelf support as a separate piece from at least one of the panel and the shelf support.

In another aspect or the invention, the shelf further includes a slide to receive and support a separate article, including, a drawer or the like, for example, in sliding engagement under the panel. The perimeter rim defines a front slide receptacle at a front edge of the panel and a back slide receptacle at a back edge of the panel. The slide is releasably coupled with each of the front and back slide receptacles.

In yet a further aspect of the invention, the shelf support has at least one hole through the shelf support and a portion of the one piece member extends at least into the hole to mechanically fasten the shelf support and the one piece member together. The shelf support may also include two elongated brackets. One of the two brackets may be generally parallel with one of the two opposing panel edges, while the other of the two brackets is generally parallel with the other of the two opposing panel edges. A third bracket may be positioned between the first two brackets. The one piece member couples the third bracket with the perimeter edge of the panel. The third bracket has a flange and the one piece member has a cooperating slot, so the flange is received and captured in the slot.

The invention also includes an apparatus to make an encapsulated shelf assembly which incorporates the aspects discussed above. The apparatus has a mold with a first part and a second part which abut one another to define a mold cavity therebetween, to support a shelf support in the mold cavity, and to support a shelf panel with an edge of the shelf panel extending into the mold cavity. The apparatus also has at least one post with a post head and a post shaft extending away from the post head. The post is positioned in the mold cavity with the post head interposed between the shelf support and the mold to position the shelf support in the mold cavity in spaced relation to the sides of the mold cavity.

In one aspect of the invention, the shelf support has an aperture and the post shaft extends into that aperture. Further, the aperture may extend through the shelf support, the post shaft may extend through and beyond the shelf support, and the apparatus may include a cooperating nut with an opening to couple with the post shaft on a side of the shelf support opposite the post head. The shelf support may be interposed between the post head and the nut with the post head and nut interposed between the first part and the second part of the mold, whereby the shelf support is spaced from the sides of the mold cavity and supported in the mold cavity.

The invention further includes a process of making an encapsulated shelf assembly which incorporates the aspects discussed above. This process includes the steps of providing a mold apparatus defining a mold cavity, providing and supporting a shelf panel in the mold apparatus with an edge of the shelf panel extending into the mold cavity, providing and supporting a shelf support in the mold apparatus with a majority of the shelf support positioned in the mold cavity and spaced from the sides of the mold cavity, filling the mold cavity with a moldable material to encapsulate each of the majority of the shelf support and the edge of the shelf panel, and removing the encapsulated shelf assembly from the mold cavity. In one aspect of the invention, the step of supporting the shelf support in the mold cavity may include mounting at least one spacing member on the shelf support, the spacing member engaging the sides of the mold cavity to space the shelf support from the sides of the mold cavity and support the shelf support. The shelf support may also be provided with a mounting portion which extends out of the mold cavity to support the remaining portion of the shelf support in the mold cavity, the mounting portion of the shelf support being clamped in the mold apparatus.

The process may also include the steps of providing at least one shelf support with at least one alignment aperture and at least one hole, providing an alignment post with a head and a shaft extending away from the head, inserting the alignment post shaft into the shelf support alignment aperture, pushing the alignment post head against one side of the shelf support, providing a panel with two opposing panel edges, providing a mold to enclose the two opposing edges of the panel and the shelf support, positioning the shelf support in the mold, positioning the panel in the mold, closing the mold to enclose the shelf support and the panel and to form a mold cavity defining a contiguous void space around at least a substantial majority of the shelf support and around the two panel edges, and filling the mold cavity with a moldable material to encapsulate each of the two panel edges and the substantial majority of the shelf support. In one aspect of the method, at least one elongated member with a body portion and a mount portion is provided for the shelf support. Further, the mount portion of the elongated member is adapted to releasably couple at a plurality of vertically spaced positions with an interior surface of a refrigerated compartment.

In another aspect of the method, a cooperating alignment nut formed with an opening to couple with the alignment post shaft is provided. The alignment post shaft is inserted into the shelf support alignment aperture, the alignment post head is pushed against one side of the shelf support, the alignment nut is mounted on the alignment post shaft with the shaft received in the nut opening, and the alignment nut is positioned against a side of the shelf support which is opposite the alignment post head.

In a further aspect of the method, the mold is formed with two mold portions. A void is formed in the first mold portion and the second mold portion slidingly engages the void to define a portion of the mold cavity. The step of positioning the shelf support in this mold further includes clasping the alignment post between the first and second portions of the mold to firmly hold the shelf support in the mold with the at least a substantial majority of the shelf support positioned in the mold cavity, spaced from each of the first mold portion and the second mold portion.

These and other features, objects, and benefits of the invention will be recognized by those who practice the invention and by those skilled in the art, from the specification, the claims, and the drawing figures.

BRIEF DESCRIPTION OF THE DRAWINGS

FIG. 2 is a cross-sectional view along line II—II of FIG. 1;

FIG. 3 is a cross-sectional view along line III—III of FIG. 1;

FIG. 17 is a cross-sectional view along line XVII—XVII of FIG. 16;

FIG. 19 is a fragmentary rear elevational view of the center portion of the shelf of FIG. 16 with the center bracket removed;

FIG. 20 is a fragmentary bottom plan view of the shelf portion shown in FIG. 19;

FIG. 21 is a lower perspective view of the center bracket of the shelf of FIG. 16;

FIG. 22 is a top plan view of the bracket of FIG. 21;

FIG. 23 is the view of FIG. 2 showing an alternative embodiment of a shelf according to the present invention;

FIG. 24 is a cross-sectional view along line XXV—XXV of FIG. 23;

FIG. 25 is the view of FIG. 24 showing an alternative molding configuration;

DETAILED DESCRIPTION OF THE PREFERRED EMBODIMENTS

Figure 1:
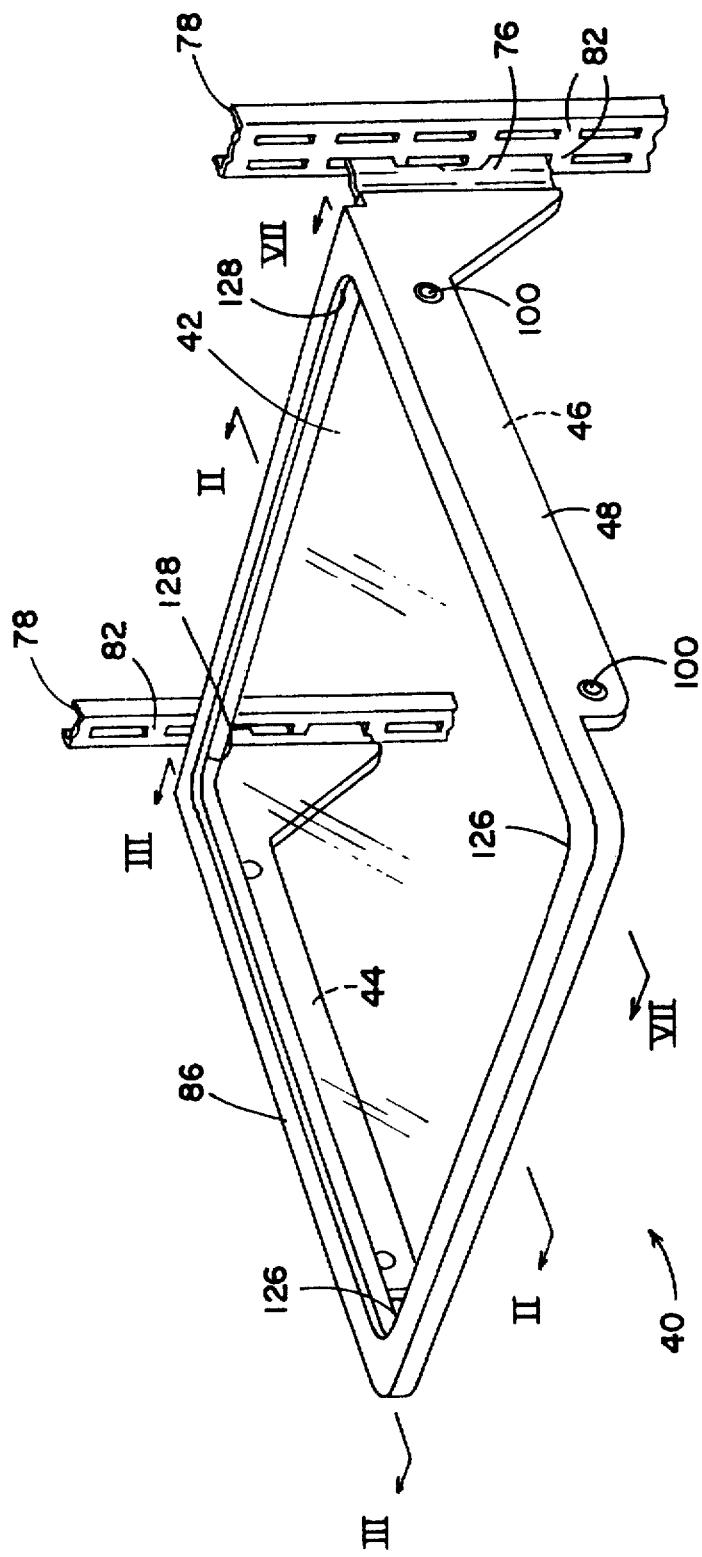
FIG. 1 is a perspective view of a shelf according to the present invention.

Referring to the drawing figures in greater detail, and FIGS. 1–4 in particular, a shelf assembly 40 according to the present invention comprises a generally planar shelf panel 42, support brackets 44 and 46, and a one piece member or encapsulating cover 48 preferably formed from a moldable material as explained below. Member 48 encapsulates a perimeter edge 56 of panel 42 and a substantial majority of the brackets 44, 46. Shelf assembly 40 is preferably cantilevered forward by brackets 44 and 46 from a generally vertical surface, such as the rear wall of a refrigerator, for example. Shelf assembly 40 may also be adapted for other support structures, such as a sidewall for example. Shelf assembly 40 is preferably sized to provide air circulation space between the shelf assembly and adjacent vertical surfaces of the refrigerator for proper circulation.

Shelf panel 42 may be any suitable shelving material, including a light transmitting material, for example, and is preferably about 0.130 inch (3.3 mm) thick, optically clear tempered glass to enhance light distribution through a refrigerated compartment. Perimeter edge 56 of shelf panel 42 is preferably located above brackets 44 and 46 at two opposing sides of shelf assembly 40. Brackets 44 and 46 are mirror image replicas of one another and are uniformly incorporated in shelf assembly 40. Thus, bracket 44 will be discussed in greater detail with the understanding that the discussion applies equally to bracket 46.

Figures 4, 5, 6:
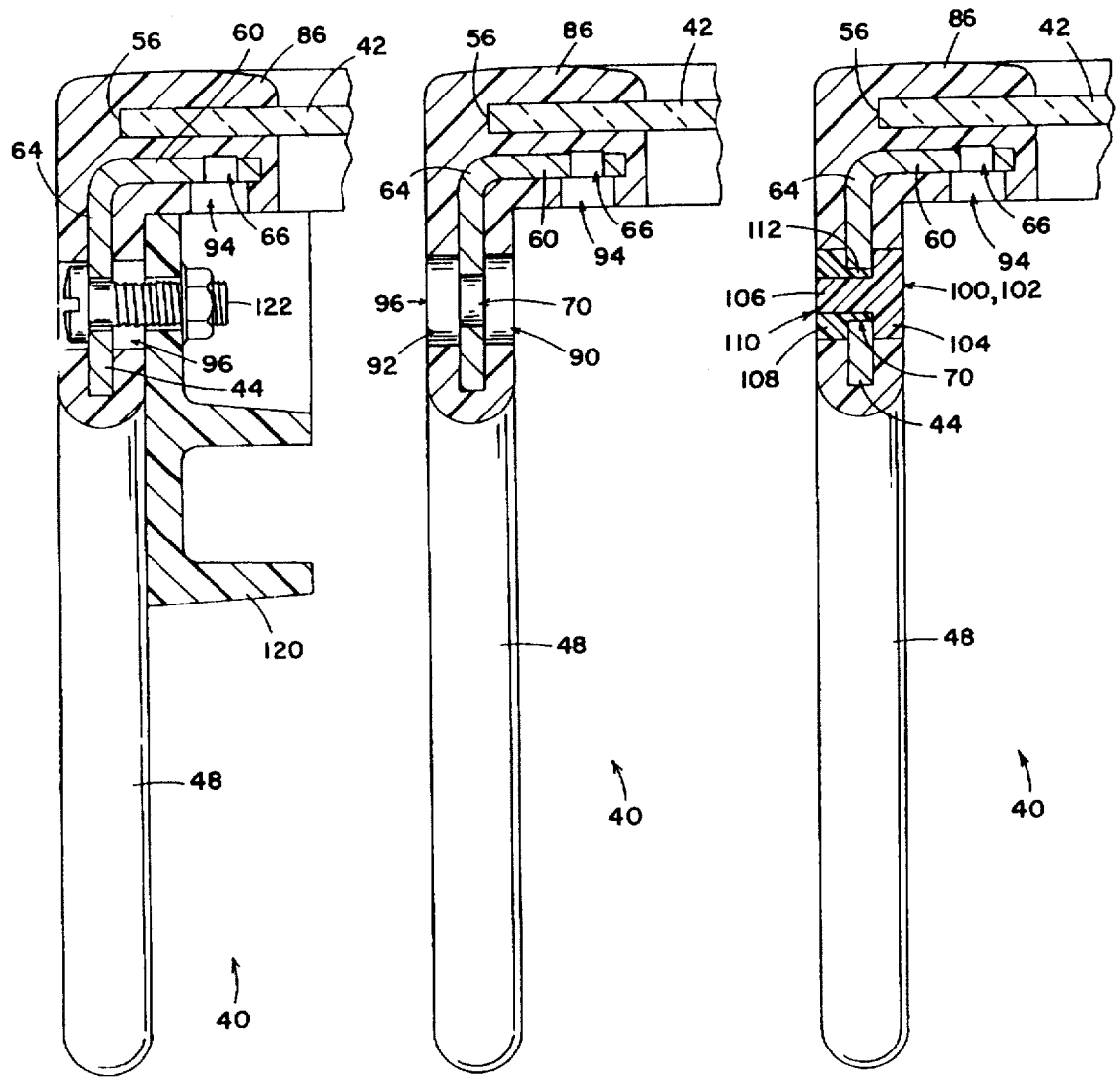
FIG. 4 is a fragmentary cross-sectional view along line IV—IV of FIG. 3.
FIG. 5 is the view of FIG. 4 with the plug removed.
FIG. 6 is the view of FIG. 5 with an optional member mounted.

As shown in FIG. 4, a flange portion 60 projects inwardly at a top edge of a generally vertical web portion 64 of bracket 44. Flange 60 is provided with two indexing apertures 66 and a series of fastening holes 68 (FIGS. 3 and 23) to mechanically connect bracket 44 with one piece member or encapsulating cover 48 (FIGS. 3–6), as will be discussed in greater detail below. Web 64 is also provided with two indexing apertures 70 and several molding holes 72 (FIGS. 3 and 23). Support bracket 44 may be fabricated of conventional materials by conventional methods as is well known for adjustable shelving brackets. For a refrigerator environment, bracket 44 is most preferably about fourteen gage (0.0781 inch, 1.98 mm) steel with a powder coat finish. One such finishing product which performs well and is readily available, is commonly known as Herberts Epoxy Polyester 071-30-06 White, available from Herberts Powder Coatings, Inc. of Hilliard, Ohio.

While shelf assembly 40 may be used as a fixed shelf, shelf assembly 40 is preferably used as a vertically adjustable shelf. Therefore, bracket 44 is provided with a support body portion 74 and a support mount portion 76 (FIG. 3). Support mount 76 is adapted for releasable engagement at a plurality of vertically spaced positions with a support surface as may be provided by adjustable shelf tracks 78 (FIG. 1), as is commonly practiced. Thus, support mount 76 is preferably formed with hooks 80 to engage rungs 82 in tracks 78 (FIGS. 1 and 3). Shelf assembly 40 may, thereby, be positioned at a plurality of vertically spaced locations along tracks 78.

Encapsulating cover 48 is most preferably formed in one piece around perimeter edge 56 of panel 42 and around at least a significant majority of the brackets 44, 46, namely, support body portion 74 for tight connection of panel 42 with the brackets. One piece member 48 is formed from any suitable moldable material, including, but not limited to, structural, resinous plastics such as ABS, polyvinyl chloride, or copolymers, such as a combination of ethylene and polypropylene, for example. One readily available material which performs well and meets FDA regulations for food packaging applications is Tenite® Polypropylene P5M4K-007, available from Eastman Chemical Products, Inc., a marketing affiliate of Eastman Kodak Company. A coloration pigment may be added to the moldable material from which one piece member 48 is formed in order to provide desired colors. Titanium dioxide may be added for a white coloration for example. In a refrigerator shelf application of the invention, the materials used must, of course, be FDA approved for food contact.

In the embodiment shown, one piece member 48 encapsulates perimeter edge 56, forming a rim 86, and encapsulates support body portion 74, except for small areas around the flange and web indexing apertures 66 and 70, respectively, with an about 0.0787 inch (2 mm) thick sheathing (FIGS. 1–6). Support mount 76 is not encapsulated by member 48, but remains uncovered to engage and releasably couple with the adjustable shelf tracks 78, which are commonly used for adjustable shelving. Thus, member 48 encapsulates a significant majority of the brackets 44, 46, but does not entirely encapsulate the brackets. Portions not encapsulated include support mount 76; a first recess 90, and a second recess 92, each provided in member 48 at each web indexing aperture 70; and an index recess 94, provided at each flange indexing aperture 66 (FIG. 5). The first and second recesses 90, 92 align with web indexing aperture 70 to define a fastening aperture 96 through shelf support bracket 44.

Figure 10:
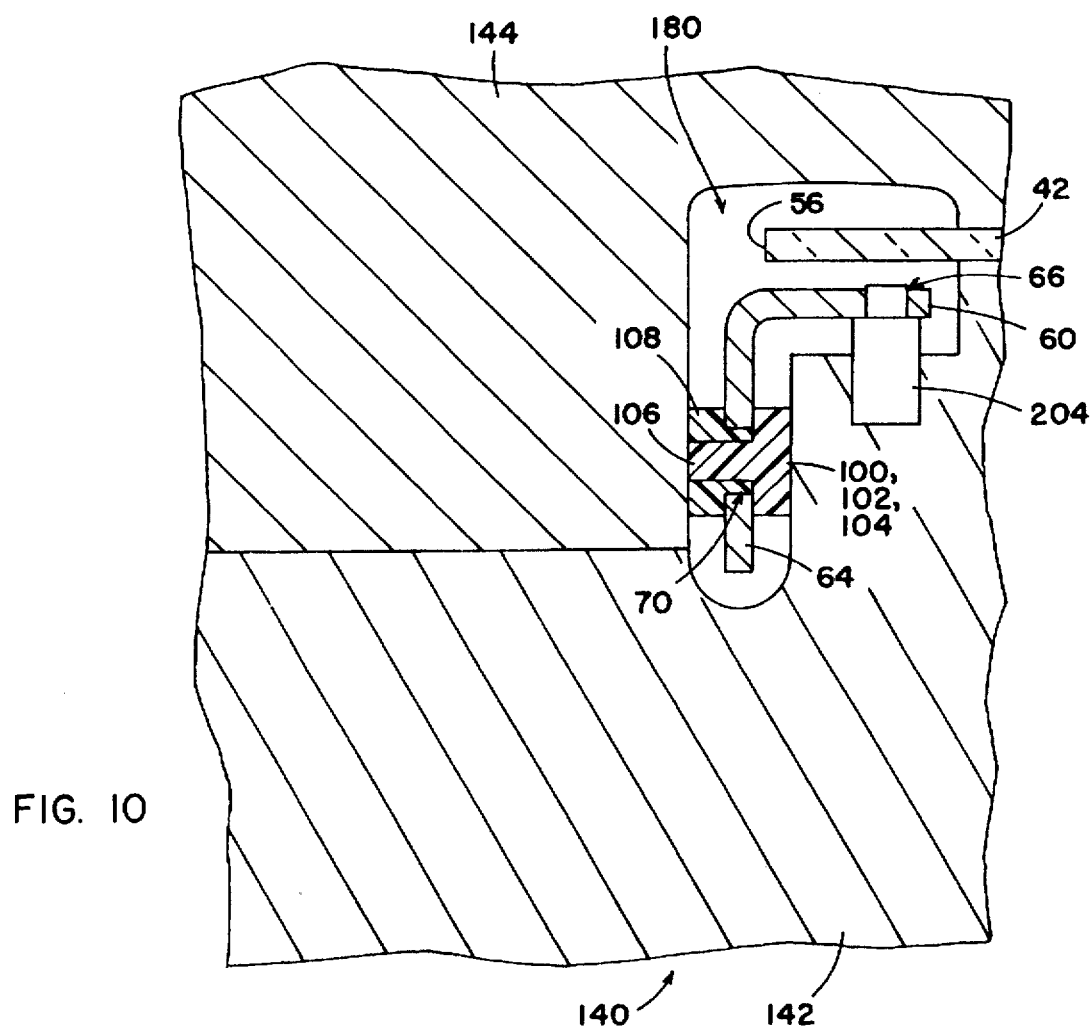
FIG. 10 is an enlarged view of detail X of FIG. 8.
Figure 11:
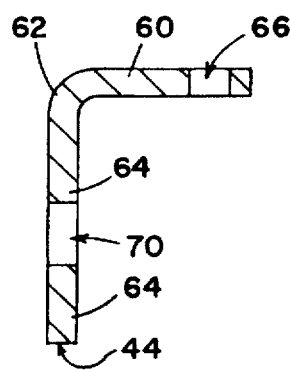
FIG. 11 is a cross-sectional view of a support bracket according to the present invention.
Figure 12:
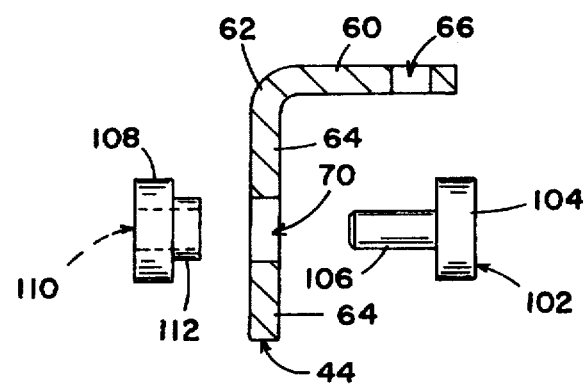
FIG. 12 is the view of FIG. 11 showing assembly of a plug with the bracket.
Figure 13:
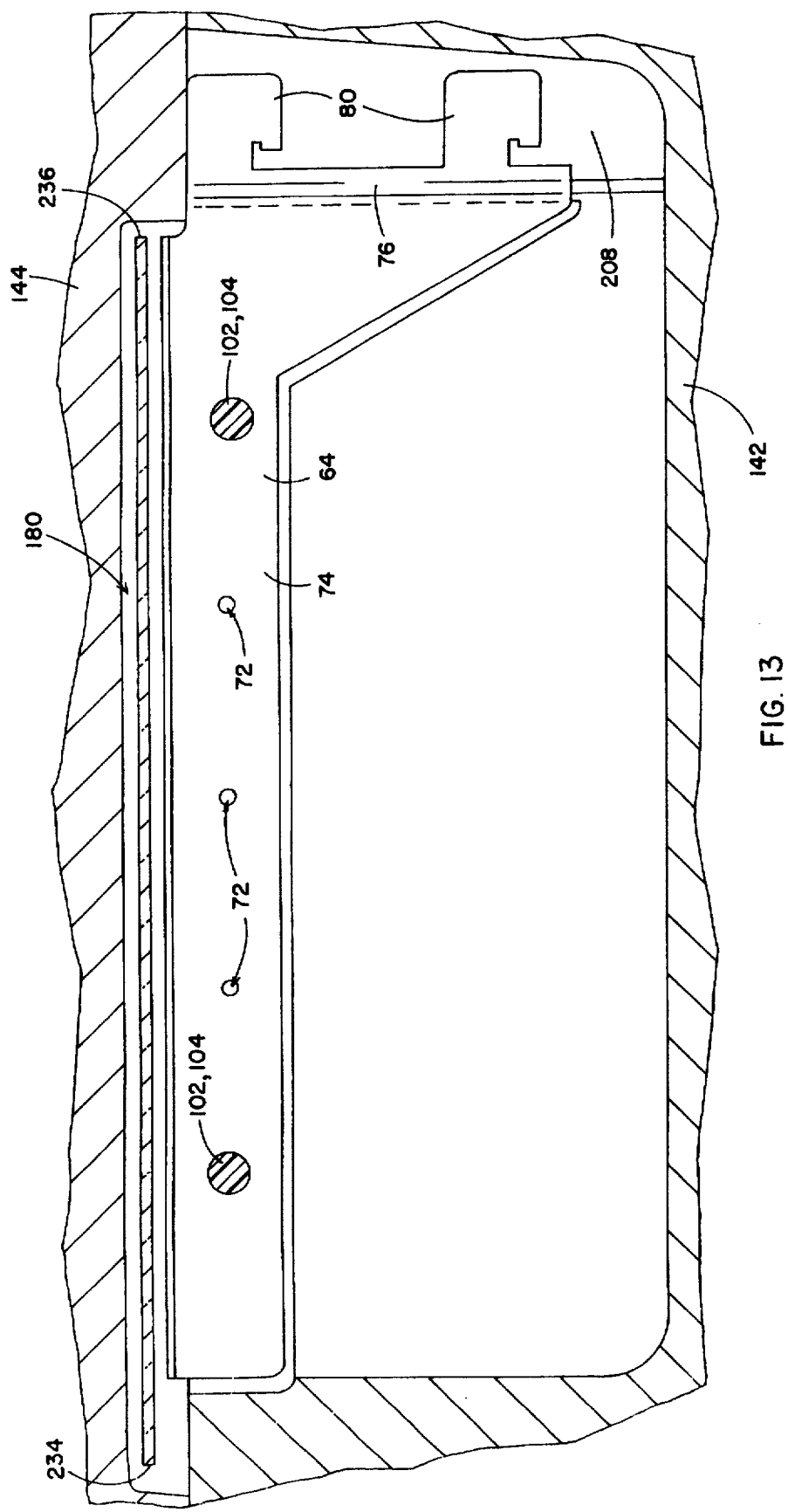
FIG. 13 is a fragmentary cross-sectional view along line XIII—XIII of FIG. 8.
Figure 14:
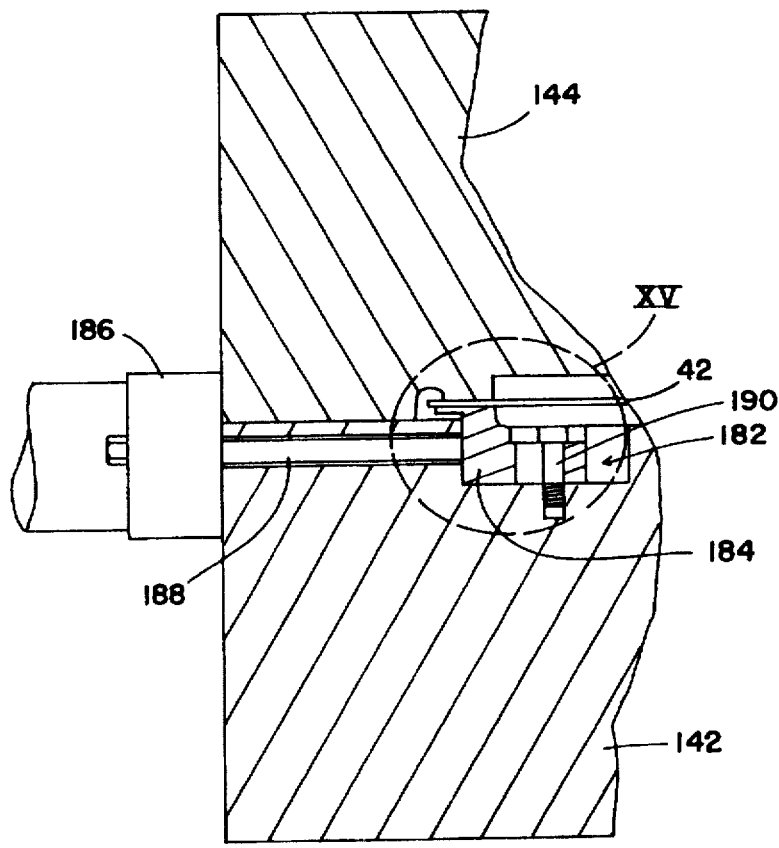
FIG. 14 is a cross-sectional view along line XIV—XIV of FIG. 9.
Figure 15:
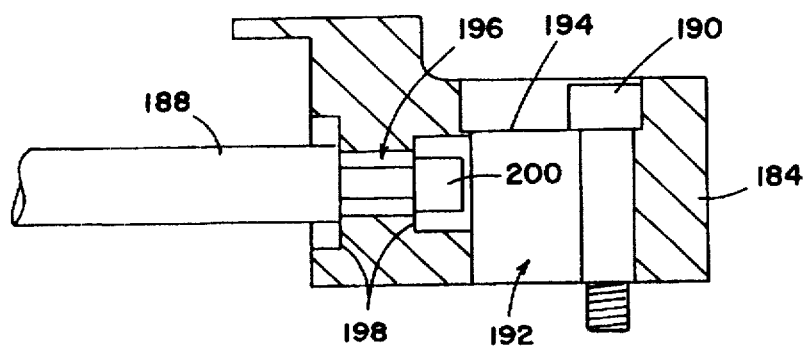
FIG. 15 is an enlarged view of detail XV of FIG. 14.

Shelf assembly 40 further includes a plug 100 which comprises a post 102 with a head 104 and shaft 106 and a cooperating nut 108 (FIGS. 4, 10, and 11). As will be explained below, post 102 and nut 108 are useful in forming member 48 around the brackets 44, 46. Post shaft 106 extends through a web indexing aperture 70 with post head 104 positioned to abut one side of bracket web 64. Cooperating nut 108 is formed with an aperture 110 to receive post shaft 106. Nut 108 is mounted on post shaft 106 with the nut abutting bracket web 64 on a side opposite post head 104. Nut 108 may be an annular member and may optionally be formed with a skirt portion 112 as shown in the embodiment of the drawing figures, with skirt portion 112 extending into web indexing aperture 70, between bracket web 64 and post shaft 106. Post head 104 is seated in first recess 90, defined in member 48, while nut 108 is seated in second recess 92, defined in member 48. While plug 100 is shown in the drawing figures with post head 104 on the same side of bracket web 64 as bracket flange 60 and nut 108 is shown on a side of bracket web 64 opposite to bracket flange 60, the respective positions of post head 104 and nut 108 may, of course, be interchanged, as will occur to those who are skilled in the art and to those who practice the invention.

Similar to member 48, plug 100 may be formed from any suitable moldable material, including, but not limited to, structural, resinous plastics such as ABS polyvinyl chloride, or copolymers, for example, as discussed more particularly above. Depending upon the characteristics desired, plug 100 may be formed of the same material as member 48 or may be formed of a material having contrasting properties to those of the material for member 48, such as having a higher or lower temperature melting point for example. The inventors have specifically found an acetal resin thermoplastic marketed under the trademark Delrin™ by E. I. Du Pont de Nemours & Company to perform satisfactorily for plugs 100.

By the choice of material of plug 100 relative to the material for member 48, plug 100 may be fused or effectively welded with member 48 or plug 100 may be removable from member 48 and either of support brackets 44 and 46 to reveal fastening apertures 96 so a storage device, for example, may be attached to the support bracket, such as a slide rail or guide 120 (FIG. 6) as disclosed in U.S. Pat. No. 5,273,354, entitled MOLDED REFRIGERATED SHELF AND SUPPORT BRACKET and issued on Dec. 28, 1993, to Herrmann et al., the disclosure of which is incorporated here by reference. Slide guide 120 may be attached by use of screws or bolts 122 at two spaced positions along the length of web 64 as specifically shown in FIG. 6, by riveting, or by engagement of a fastening prong which extends into fastening aperture 96 from slide guide 120 or the like as are commonly known for mounting or assembling shelving components.

As discussed above, one piece member 48 encapsulates perimeter edge 56 of panel 42 with a rim 86 (FIGS. 1–6). Rim 86 is most preferably a perimeter rim which surrounds perimeter edge 56 and extends above a top surface of shelf panel 42 to define a spill dam and contain spills disposed upon shelf panel 42 as disclosed in U.S. patent application Ser. No. 07/665,661, entitled MOLDED REFRIGERATOR SHELF and filed on Mar. 7, 1991, by Bird et al., now U.S. Pat. No. 5,362,145, the disclosure of which is incorporated here by reference. By molding rim 86 about perimeter edge 56, a liquid resistant seal is created between shelf panel 42 and rim 86 to minimize, if not entirely preclude, seepage of spills between shelf panel 42 and rim 86. Depending upon the specific material used to form one piece member 48 and rim 86, the seal may be enhanced by coating perimeter edge 56, including the edge surface and adjoining portions of the top and bottom surfaces of shelf panel 42, with a primer layer of a cooperating, heat activable material or the like which promotes and facilitates adhesion of rim 56 to shelf panel 42, prior to forming rim 86 about perimeter edge 56.

Figure 7:
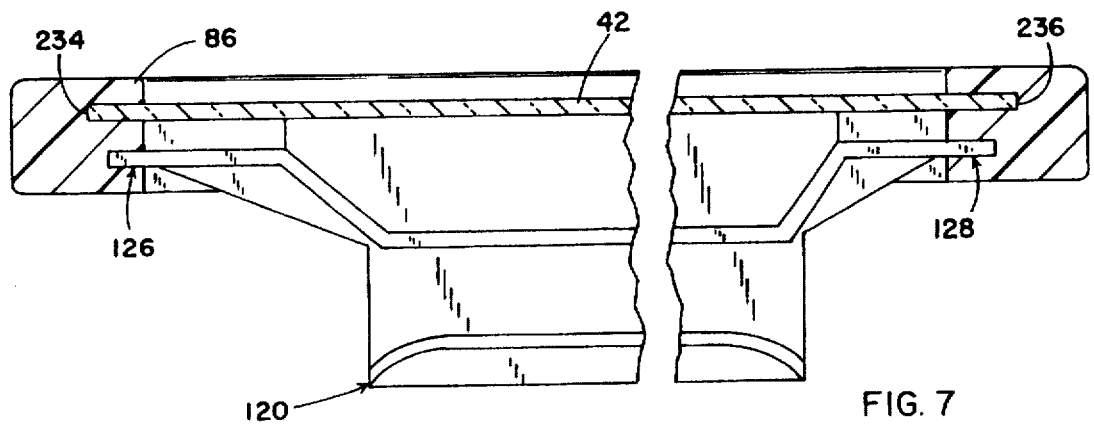
FIG. 7 is a cross-sectional view along line VII—VII of FIG. 1.

Additional storage device attachment may be provided by forming at least one front receptacle 126 in rim 86 at a front edge 234 of shelf panel 42 and at least one cooperating back receptacle 128 in rim 86 at a back edge 236 of shelf panel 42 (FIGS. 1 and 7) as disclosed in greater detail in U.S. patent application Ser. No. 07/912,778, entitled MOLDED REFRIGERATOR SHELF WITH SNAP-IN SLIDE and filed on Jul. 13, 1992, by Kane et al., now U.S. Pat. No. 5,403,084 the disclosure of which is incorporated here by reference.

Figure 8:
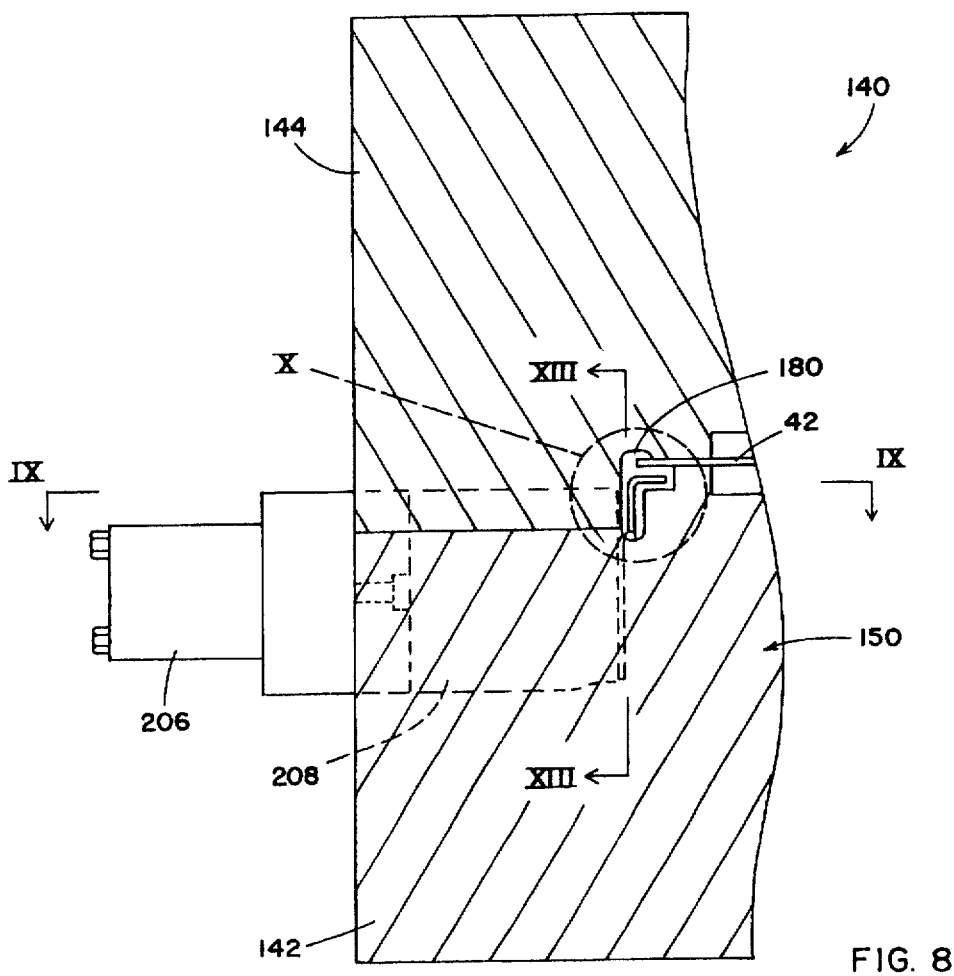
FIG. 8 is a fragmentary sectional view of a mold for producing the shelf of FIG. 1.
Figure 9:
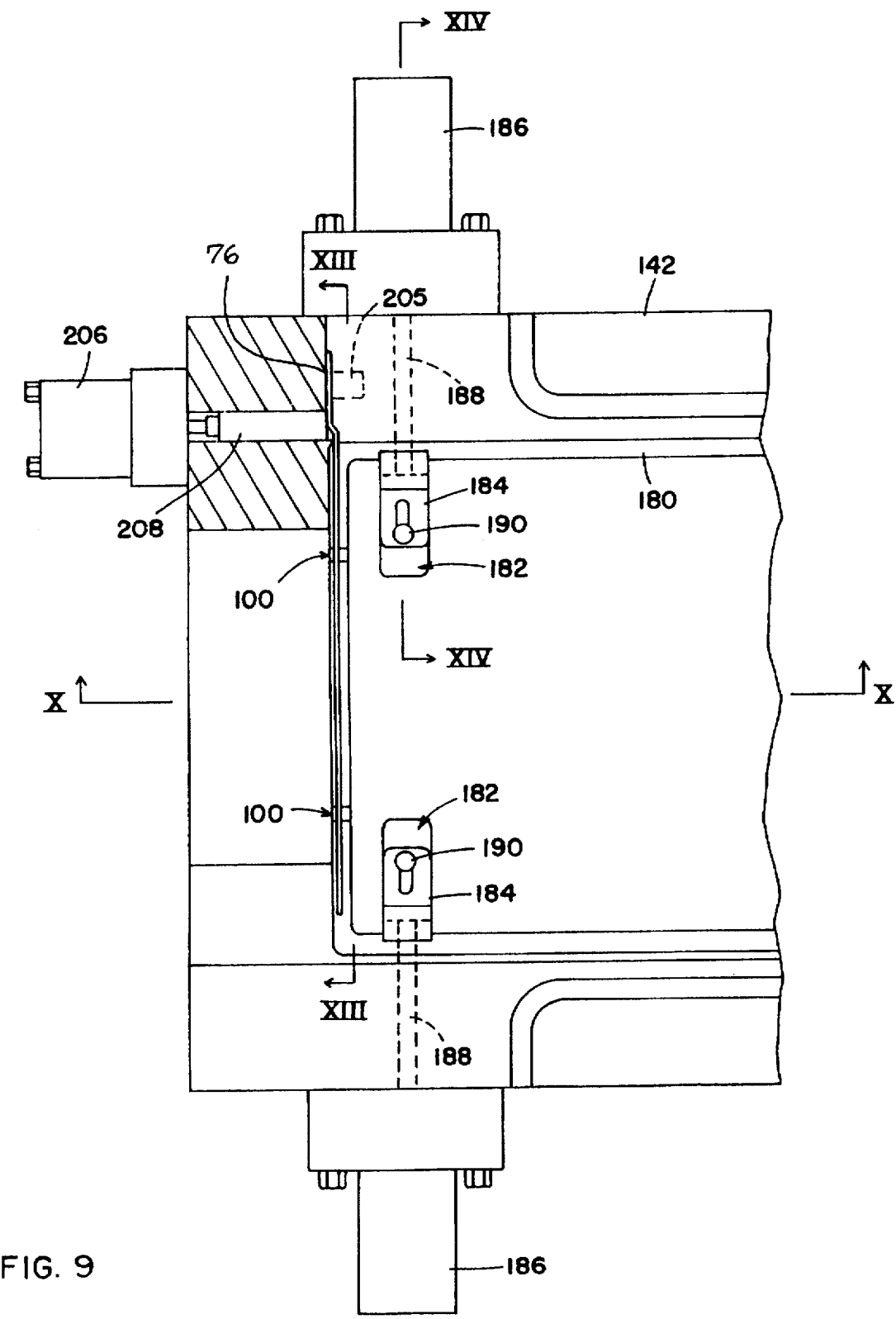
FIG. 9 is a fragmentary cross-sectional view of along line IX—IX of FIG. 8.

In production, shelf assembly 40 may conveniently be molded in a mold 140 incorporating the features disclosed in FIGS. 8–15 and discussed below. Referring more particularly to FIGS. 8 and 9, mold 140 generally includes a first or lower mold half 142 and a second or upper mold half 144. In a closed position, with first or lower mold half 142 abutting second or upper mold half 144, mold 140 forms a mold cavity 180 which defines the configuration of the encapsulating cover or sheathing of shelf assembly 40, generally discussed here as one piece member 48, including rim 86 (FIGS. 8, 10, 13, and 14). Shelf panel 42 is positioned in mold 140 to extend at least partially into mold cavity 180. Those who are skilled in the art, those who practice the invention, and those who otherwise have some familiarity with molding production technology will realize that, while some materials (including metals and some plastics, for example) suitable for shelf panel 42 may absorb significant compressive loads when clamped in mold 140, other materials (such as glass, for example) will accommodate only limited clamping loads in mold 140. Thus, mold 140 should be adapted to the particular material of shelf panel 42 as is well known in the molding industry.

As mentioned above, shelf assembly 40 may optionally be provided with front and back slide guide receptacles 126 and 128 (FIG. 7), respectively, for installation of a slide guide 120 as is discussed further in U.S. Pat. No. 5,403,084, referenced above. Thus, mold half 142 may be provided with recesses or core beds 182 (FIGS. 9 and 14) to receive sliding cores 184 to form the front slide guide receptacle 126 and back slide guide receptacle 128, in front and back portions of perimeter rim 86, respectively. Further, actuating cylinders 186 may be mounted on mold first half 142 with piston rods 188 extending through mold first half 142 into core beds 182 to couple in sliding engagement with sliding cores 184 to position sliding cores 184. Each sliding core 184 is positioned on and connected with mold half 142 by a cap bolt 190 (FIGS. 9, 14, and 15) or the like, and is provided with an elongated fastening slot 192 having a shoulder 194 so the core 184 is slidable in core bed 182 and held in the core bed by bolt 190.

Each of shelf support brackets 44 and 46 is provided with a pair of plugs 100, mounted in the two web indexing apertures 70 (FIGS. 9–13). Mold 140 is opened by separating first half 142 and second half 144 so support brackets 44 and 46 may be positioned on mold first half 142 by manual or automated means, with flange indexing apertures 66 coupling with cooperating indexing pins 204. Each of shelf support brackets 44 and 46 is most preferably fabricated of a magnetic material and may, therefore, be held in place on mold first half 142 by a rare earth magnet 205 (FIG. 9) embedded in first half 142 as is commonly practiced and known in the molding industry and holding support mount portion 76 (FIG. 9).

After the shelf support brackets 44 and 46 are positioned in the mold, or simultaneous to their positioning, shelf panel 42 is also positioned in mold first half 142 by manual or automated means, and may be held in mold 140 by conventional methods. With the shelf support brackets 44, 46 and shelf panel 42 positioned on mold first half 142, mold 140 is closed by firmly abutting first half 142 and second half 144 together. Sliding cores 184 are preferably pulled outward into a molding position by cylinders 186 prior to placing shelf panel 42, but are so positioned at least prior to actual molding.

Second half 144 is also provided with actuating cylinders 206 (FIGS. 8 and 9) to manipulate a slide 208 and firmly clamp support mount portion 76 of each of shelf support brackets 44 and 46 between slide 208 and mold first half 142 after mold 140 is closed or simultaneous with closing. With mold 140 closed and shelf support brackets 44 and 46 secured, the moldable material to form the encapsulating cover or sheathing and perimeter rim 86 of one piece member 48 is injected into mold cavity 180 by machinery and passageways through mold 140 which are commonly known and understood in the plastic molding industry. As the moldable material forming one piece member 48 enters mold cavity 180 and flows through the mold cavity, the material flows around perimeter edge 56 of shelf panel 42, flows around portions of sliding cores 184 which extend into mold cavity 180, and flows around shelf support brackets 44 and 46 until mold cavity 180 is filled with the moldable material. The moldable material also flows through flange fastening holes 68 (FIG. 23) and web molding holes 72 to make a secure mechanical connection between one piece member 48 and shelf support brackets 44 and 46.

Without the presence of plugs 100 (FIG. 10), the flow of the moldable material around the support brackets 44 and 46 may deflect the brackets causing them to twist out of position. However, with plugs 100 in place, shelf support brackets 44 and 46 are tightly clamped and securely positioned between plug post head 104 and nut 108, which in turn are clamped between mold first half 142 and second half 144.

After the moldable material forming one piece member 48 is allowed to set-up, harden, and cool, mold 140 is opened. Cylinders 186 are activated concurrent with opening mold 140 cylinders 186 are activated to slide sliding cores 184 inward and clear of mold cavity 180 and newly formed perimeter rim 86. Once mold 140 opens, shelf assembly 40 is removed from the mold.

In production and as is also well known in the molding industry, mold 140 will be provided with means for cooling and heating such as a water circulation system, to initially heat the mold to a desired steady state operating temperature prior to starting a production run and to maintain the mold at that desired production temperature throughout the duration of the production run of shelf assembly 40. Thus, depending on a number of production factors, including ambient temperature and the cycling time of mold 140, for example, the mold may require supplemental heating or cooling throughout the production run to maintain the desired production temperature.

Shelf assembly 40 may be a relatively narrower shelf assembly for use in the relatively narrower compartments of a side-by-side refrigerator or as a partial width shelf in a compartment of a top or a bottom mount refrigerator as is disclosed in greater detail in U.S. patent application Ser. No. 07/989,087, entitled ADJUSTABLE REFRIGERATOR SHELVING and filed on Dec. 11, 1992, by Bird et al., now U.S. Pat. No. 5,454,638, the disclosure of which is incorporated here by reference.

Figure 18:
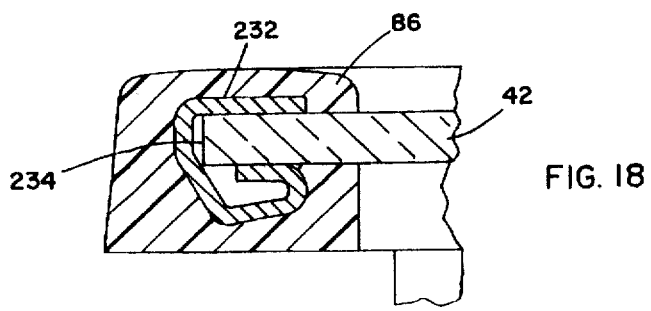
FIG. 18 is an enlarged view of detail XVIII of FIG. 17.
Figure 16:
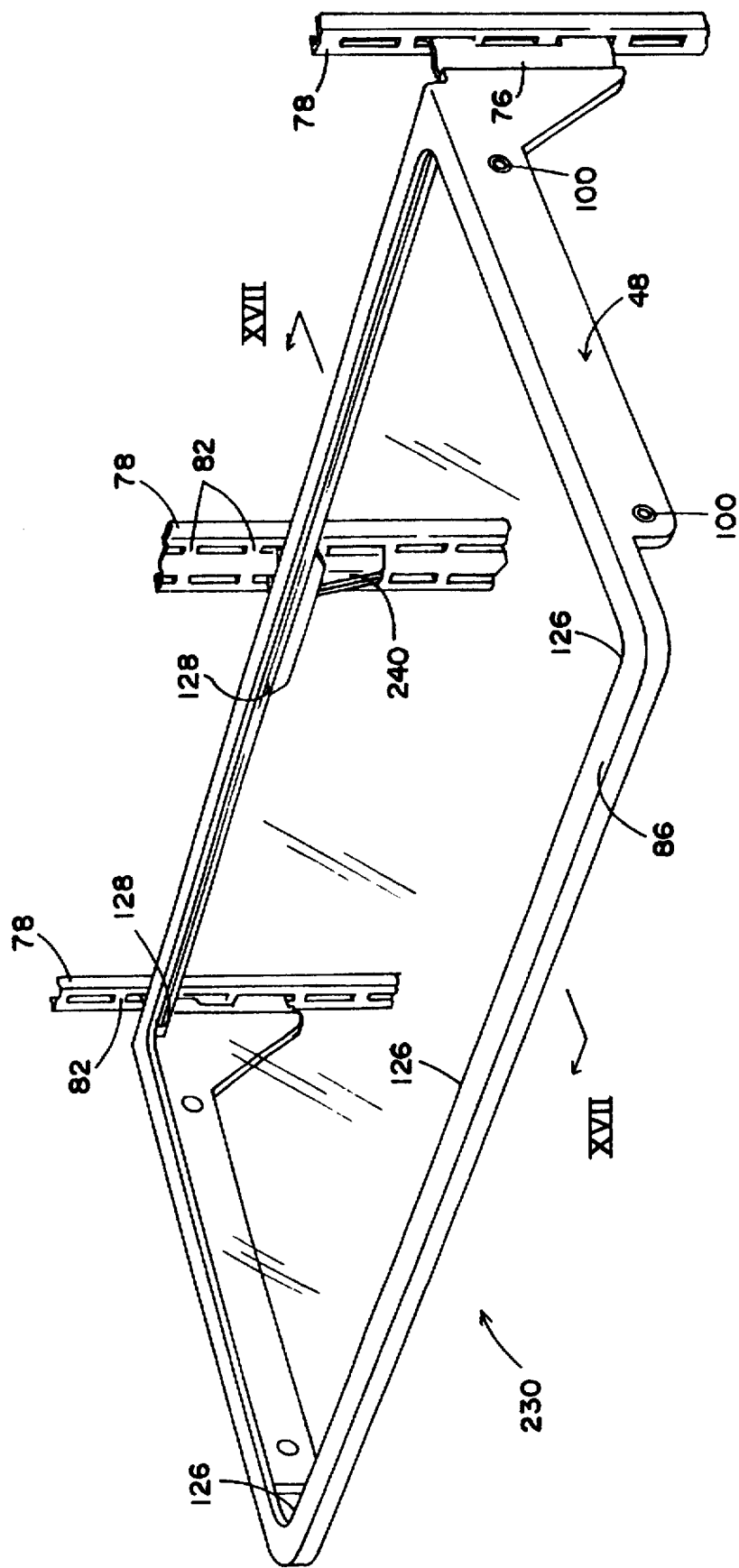
FIG. 16 is a perspective view of an alternative, wide embodiment of a shelf according to the present invention.

Shelf assembly 40 may also be a relatively wider shelf assembly as is more specifically shown in FIG. 16 as an elongated shelf assembly 230, provided according co this invention for a full width shelf in a top or a bottom mount refrigerator or the like. Because of the extended width or shelf assembly 230, anti-sagging reinforcement may be included. Thus, shelf assembly 230 may further be provided with a stiffening channel 232 (FIGS. 17 and 18) wrapped around at least a front edge 234 of shelf panel 42. Stiffening channel 232 may be extruded from 1018 cold-rolled steel or otherwise formed to create an elongated, open-sided channel member, sized to snugly slip-fit over the front edge 234 of shelf panel 42. While stiffening channel 234 is depicted in the drawing figures with a stylized "G" section or profile, those who are skilled in the art and those who practice the invention will appreciate the fact that numerous alternative profiles, including, but not limited to, "E", "F", and "S" or "Z" shapes, for example, may be used to develop the required greater section modulous along the front edge 234 of shelf panel 42 to resist vertical loading deflection and, ultimately, fracture or failure. They will also appreciate that stiffening channel 232 may be formed of various, readily available structural materials, including, plastics as well as metals, for example, and may be formed by various, readily available methods. To minimize potential corrosion of stiffening channel 232, the channel is most preferably E-coated according to common automotive industry finishing standards, including tire process of an ionized washed steel step, a zinc phosphate dip, electrostatic painting, and curing or baking at about three hundred eighty to four hundred ten degrees Fahrenheit.

A stiffening channel 232 may also be provided along a back edge 236 of shelf panel 42. However, a center support bracket 240 (FIGS. 17 and 19–22) is preferably provided instead. Bracket 240 may be conveniently formed from two symmetrical or mirror image pieces stamped from sixteen gage steel and spot welded together, for example. For refrigerator shelving use, bracket 240 may typically be provided with a white powder-coat finish as discussed in greater detail above regarding shelf support brackets 44 and 46. Bracket 240 has a body portion 242 which extends rearward to a double hook arrangement 244 to mate with a two row adjustable shelf track 78 or the like, commonly found as a center of three shelf tracks provided in contemporary top or bottom mount refrigerators. Of course, the configuration of bracket 240 in consideration of releasable engagement with an adjustable shelf track will be dictated by the particular shelving arrangement and, specifically, the shelf track with which bracket 240 will releasably couple. In front elevation, bracket 240 presents a general T-shape with a pair of opposing flanges 246 extending from a top edge of the body portion 242 or web portion. Each flange 246 is provided with a locking device, such as a barb 248, for example, to resist withdrawal of bracket 240 from the molded rim 86 of shelf assembly 230 after assembly of bracket 240 with shelf assembly 230.

A cooperating downward and rearward opening bracket slot 250 (FIGS. 19 and 20) is provided in rim 86 and generally centered along back edge 236 of shelf assembly 230. Bracket slot 250 has a cooperating main slot or horizontal portion 252 oriented generally parallel to shelf panel 42 and spaced vertically below the shelf panel to receive flanges 246. Horizontal slot 252 opens to the back of shelf assembly 230 and is sized for force-fit engagement with flanges 246 to assure that the locking device of bracket 240, namely, barbs 248 in the embodiment shown, is effective in securing bracket 240 and resisting disassembly. Bracket slot 250 also has a stem portion 254 extending and opening generally downward from horizontal slot 252 to accept the web or body 242 of bracket 240 when flanges 246 engage and seat in horizontal slot 252.

Figure 26:
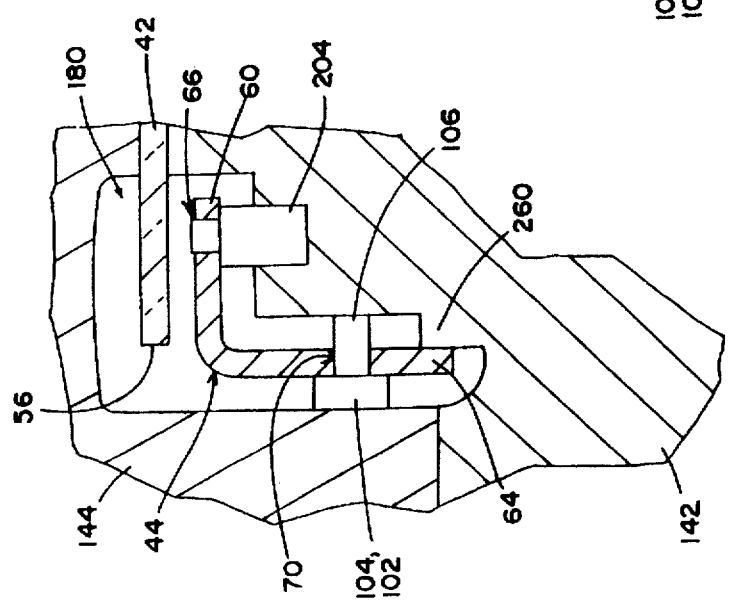
FIG. 26 is the view of FIG. 10 showing an alternative indexing arrangement to mold the shelf of FIG. 23.

In alternative molding of shelf assembly 40, mold standoffs 260 which project into mold cavity 180 may be provided to abut web 64 of shelf support bracket 44 (FIG. 26) in combination with the use of plug post 102, without plug nut 108, to index and secure shelf support bracket 44. The shaft 106 of post 102 may extend full length as discussed above and shown in FIG. 26 to provide a fastening aperture through one piece member 48 and shelf support bracket 44.

Figure 28:
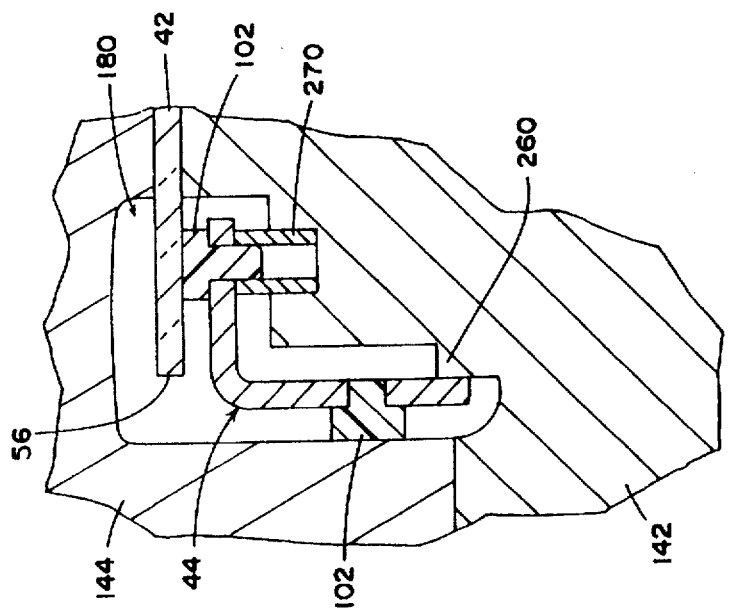
FIG. 28 is the view or FIG. 26 showing an alternative indexing arrangement to mold the shelf of FIG. 27.
Figure 27:
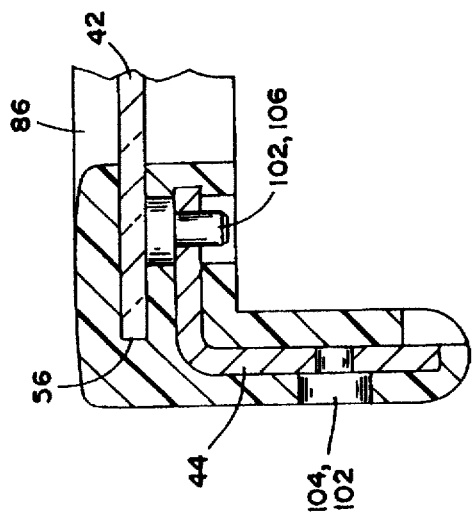
FIG. 27 is the view of FIG. 24 showing another alternative embodiment of a shelf according to the present invention.

Alternatively, post shaft 106 may be shortened to only extend into web indexing aperture 70, resulting in a shelf assembly as depicted in FIGS. 23 and 24. Of course, those skilled in the art and those who practice the invention will realize that the relative positions of plug post 102 and mold stop 260 may be interchanged as shown in FIG. 25, depending upon the specific configuration desired and application of the shelf assembly intended. The post 102 of FIG. 26 may also be replaced with a draw pin as is known in the molding field, to index and space bracket 44. It will further be appreciated that flange index pins 204 may be modified to accept another post 102 to mold a shelf assembly according to the invention in a configuration similar to that shown in FIGS. 27 and 28. In such case, cylindrical tubes or sleeves 270 are substituted for index pins 204, while posts 102 are fitted in indexing apertures 66 of support flange 60 with enlarged heads 104 forming spacers engaging and separating edge 56 of panel 42 and the top surface of flange 60. The shafts 106 of posts 102 project into sleeves 270 to firmly position the bracket in the mold cavity. Of course, posts 102, when used in such manner, will remain permanently embedded within the shelf between panel 42 and the support bracket.

It will otherwise be generally understood by those who practice the invention and by those skilled in the art, that various other modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A method of making an encapsulated shelf comprising the steps of:
   providing at least one shelf support, said shelf support having a first side, an opposing second side, at least one alignment aperture through said shelf support, and a support mount thereon;
   providing an alignment post, said post having a head and a shaft extending away from said head;
   inserting said shaft of said alignment post into said alignment aperture of said shelf support;
   positioning said head of said alignment post against said first side of said shelf support;
   providing a panel with two opposing panel edges;
   providing a mold to enclose said two panel edges and said shelf support, said mold defining a mold cavity around said two panel edges and a predetermined portion of said shelf support with said support mount of said shelf support extending out from said mold cavity;
   positioning said shelf support in said mold cavity by inserting said shelf support with said alignment post mounted thereon in said mold cavity with said head of said alignment post engaging against a surface of said mold cavity to position said shelf support relative to said mold;
   positioning said panel in said mold such that said panel edges are spaced from said shelf support;
   closing said mold to enclose said predetermined portion of said shelf support and said panel, whereby said mold cavity defines a contiguous void space around said predetermined portion of said shelf support and around said two opposing edges of said panel while said support mount extends from said mold cavity; and
   filling said void space with a moldable material, said moldable material extending around said head of said alignment post and encapsulating each of said predetermined portion of said shelf support and said two opposing edges of said panel with said support mount extending out from said moldable material.

2. The method in claim 1 further including positioning said shelf support within said mold cavity by engaging said support mount of said shelf support with said mold apparatus outside of said mold cavity.

3. The method defined in claim 2 further including the step of providing a cooperating alignment nut, said nut being formed with an opening to couple with said shaft of said alignment post;
   mounting said alignment nut on said shaft of said alignment post with said shaft received in said opening of said nut; and
   positioning said nut against said second side of said shelf support, said inserting of said shelf support in said mold cavity including engaging said head of said alignment post and said nut with opposing sides of said mold cavity to position said shelf support between said sides.

4. The method defined in claim 3, wherein said step of providing a mold further includes foaming said mold with a first mold portion;
   forming a void in said first portion;
   forming said mold with a second mold portion which slidingly engages said void in said first portion and fills a portion of said void to define a portion of said mold cavity.

5. The method defined in claim 4, wherein said step of positioning said shelf support in said mold further includes the steps of clamping said alignment post between said first mold portion and said second mold portion whereby said shelf support is firmly held and said predetermined portion of said shelf support is positioned in said mold cavity and spaced from each of said first mold portion and said second mold portion with said support mount extending out of said cavity.

6. The method defined in claim 1 further including the steps of providing a cooperating alignment nut, said nut being formed with an opening to couple with said shaft of said alignment post;
   mounting said alignment nut on said shaft of said alignment post with said shaft received in said opening of said nut; and
   pushing said nut against said second side of said shelf support.

7. The method defined in claim 1, wherein said step of providing a mold further includes forming said mold with a first mold portion;
   forming a void in said first portion;
   forming said mold with a second mold portion which slidingly engages said void in said first portion and fills a portion of said void to define a portion of said mold cavity.

8. The method defined in claim 7, wherein said step of positioning said shelf support in said mold further includes the steps of clamping said alignment post between said first mold portion and said second mold portion whereby said shelf support is firmly held and said predetermined portion of said shelf support is positioned in said mold cavity and spaced from each of said first mold portion and said second mold portion with said support mount extending out of said cavity.

9. The method in claim 1 wherein said step of inserting said shelf support and said mounted alignment post into said mold cavity further includes abutting a portion of said second side of said shelf support against a mold stand-off.

10. A method of making an encapsulated shelf assembly having a shelf support wherein a majority of the shelf support is encapsulated but a support mount of said shelf support is not encapsulated, comprising the steps of:

providing a shelf panel;

providing a plug;

providing a shelf support to support said panel said shelf support including a support mount thereon;

providing a mold apparatus defining a mold cavity having sides and adapted to support each of said shelf panel and said shelf support;

providing at least one cylindrical tube positioned in said mold apparatus;

providing at least one post with a shaft and an enlarged head;

providing at least one aperture in said shelf support, said aperture adapted to receive said shaft of said post;

inserting said shaft of said post into said aperture in said shelf support;

further inserting said shaft of said post into said cylindrical tube for aligning said shelf support in said mold cavity;

supporting said shelf panel in said mold apparatus with an edge of said shelf panel extending into said mold cavity and positioning said shelf panel above and in contact with said head of said post to space said panel away from said shelf support by a distance equal to the thickness of said head;

supporting said shelf support in said mold apparatus with said shelf support positioned in said mold cavity except for said support mount which extends out of said cavity;

said supporting of said shelf support in said mold cavity including mounting said plug on said shelf support, and inserting said shelf support and plug together in said mold cavity with said plug engaging at least one of said sides of said mold cavity such that said shelf support is spaced from the sides of said mold cavity and from said edge of said shelf panel;

filling said mold cavity with a moldable material to encapsulate each of said shelf support and said edge of said shelf panel except for said support mount, whereby said encapsulated shelf assembly is formed with said support mount extending out from said moldable material; and removing said encapsulated shelf assembly from said mold cavity.

11. The method in claim 1 wherein said positioning of said shelf support in said mold cavity further includes the step of engaging said shaft of said alignment post against a surface of said mold cavity.

12. The method in claim 2 wherein said shelf support is made of magnetic material and said engaging said support mount of said shelf with said mold apparatus outside of said mold cavity further includes embedding a magnet in said mold apparatus and magnetically attracting said support mount of said shelf support.

13. A method of making an encapsulated shelf assembly having a shelf support wherein a majority of the shelf support is encapsulated but a support mount of said shelf support is not encapsulated, comprising the steps of:

providing a shelf panel;

providing a plug;

providing a shelf support to support said panel, said shelf support including a support mount therefore;

providing a mold apparatus defining a mold cavity having sides and adapted to support each of said shelf panel and said shelf support;

providing an indexing pin, said indexing pin having a body and a shaft;

providing an indexing aperture in said shelf support adapted to receive said shaft of said indexing pin;

positioning said indexing pin in said mold apparatus so that a portion of said indexing pin including said shaft of said indexing pin extends into said mold cavity;

positioning said indexing aperture of said shelf support on said indexing pin so that said shelf support rests on said body of said indexing pin, and said shaft of said indexing pin extends through said indexing aperture of said shelf support;

supporting said shelf panel in said mold apparatus with an edge of said shelf panel extending into said mold cavity;

supporting said shelf support in said mold apparatus with said shelf support positioned in said mold cavity except for said mounting portion which extends out of said cavity;

said supporting of said shelf support in said mold cavity including mounting said plug on said shelf support, and inserting said shelf support and plug together in said mold cavity with said plug engaging at least one of said sides of said mold cavity such that said shelf support is spaced from the sides of said mold cavity and from said edge of said shelf panel;

filling said mold cavity with a moldable material to encapsulate each of said shelf support and said edge of said shelf panel except for said support mount, whereby said encapsulated shelf assembly is formed with said support mount extending out from said moldable material; and removing said encapsulated shelf assembly from said mold cavity.

14. The method in claim 1 further including the steps of:

providing an indexing pin, said indexing pin having a body and a shaft;

providing an indexing aperture in said shelf support adapted to receive said shaft of said indexing pin;

positioning said indexing pin in said mold apparatus so that a portion of said indexing pin including said shaft of said indexing pin extends into said mold cavity; and positioning said indexing aperture of said shelf support on said indexing pin so that said shelf support rests on said body of said indexing pin, and said shaft of said indexing pin extends through said indexing aperture of said shelf support.

* * * * *